(No Model.) 6 Sheets—Sheet 1.
T. SCHMAUSER.
GALVANIC THERAPEUTIC APPARATUS.
No. 312,660. Patented Feb. 24, 1885.
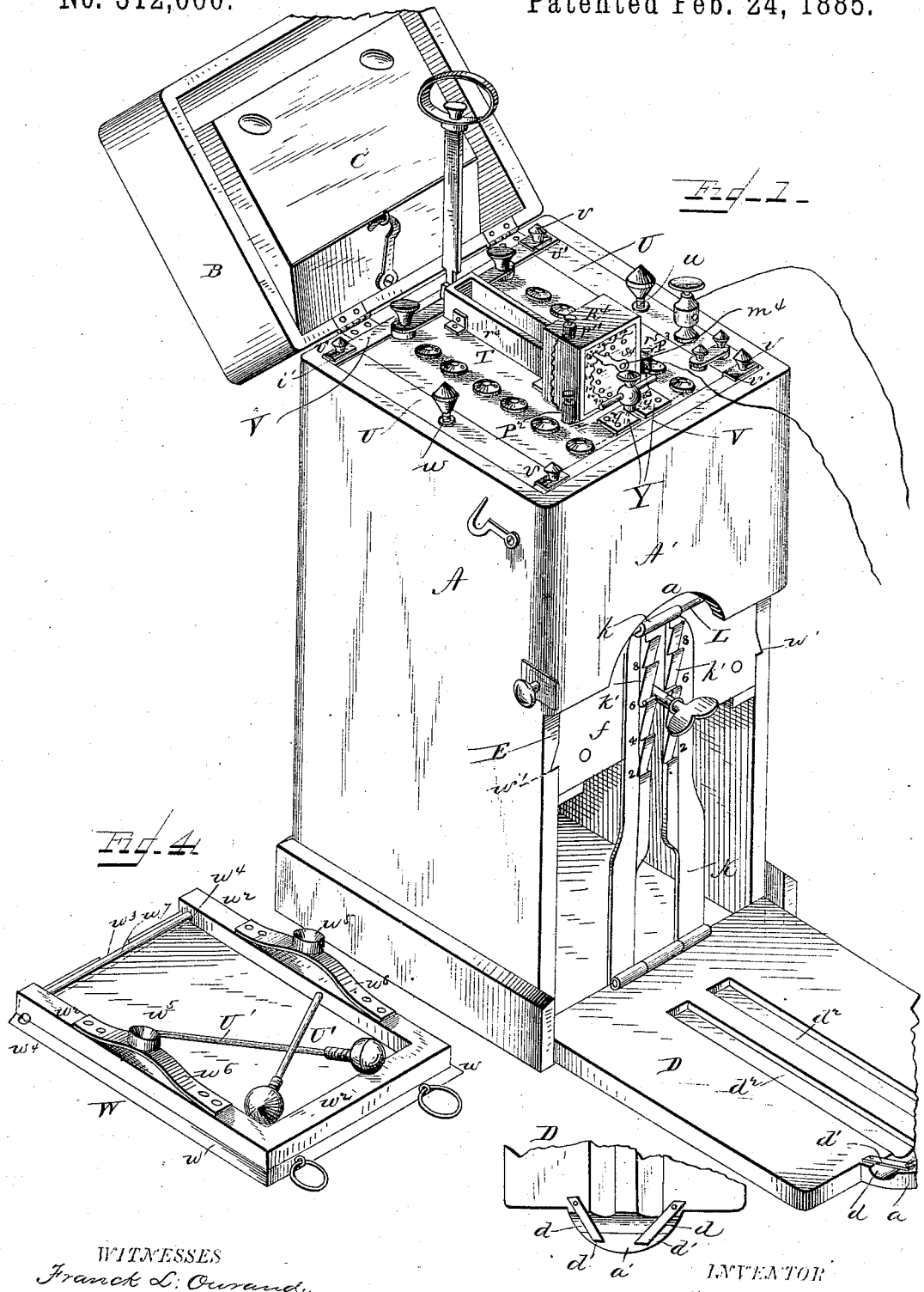
WITNESSES
Franck L. Ourand
Geo. F. Downing
INVENTOR
Theodore Schmauser
By H. A. Suymon
Attorney (No Model.)  6 Sheets—Sheet 2.
T. SCHMAUSER.
GALVANIC THERAPEUTIC APPARATUS.
No. 312,660. Patented Feb. 24, 1885.
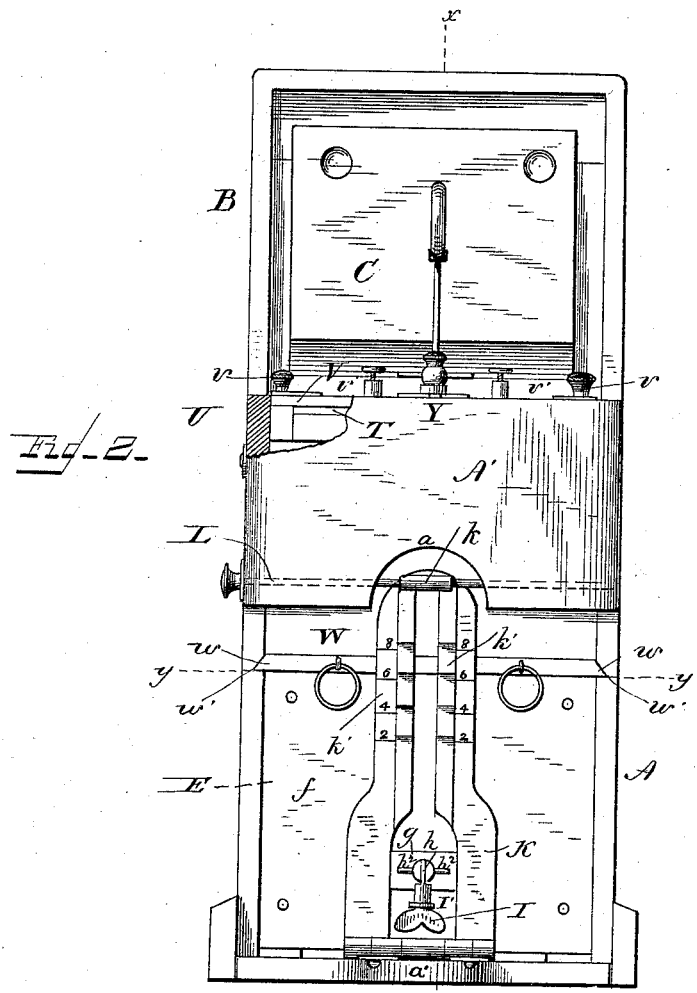
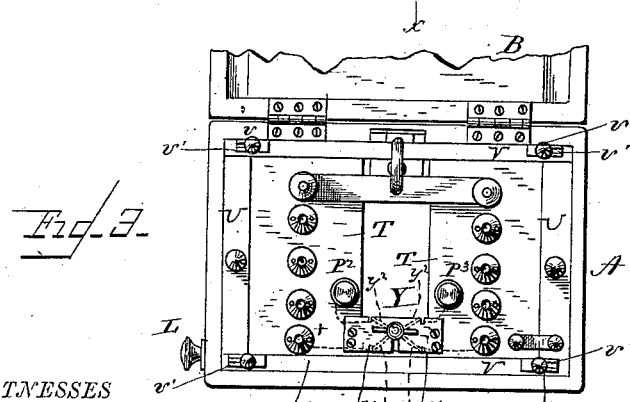
WITNESSES
Franck L. Ourand
Geo. F. Downing
INVENTOR
Theodore Schmauser
Attorney (No Model.) 6 Sheets—Sheet 3.
T. SCHMAUSER.
GALVANIC THERAPEUTIC APPARATUS.
No. 312,660. Patented Feb. 24, 1885.
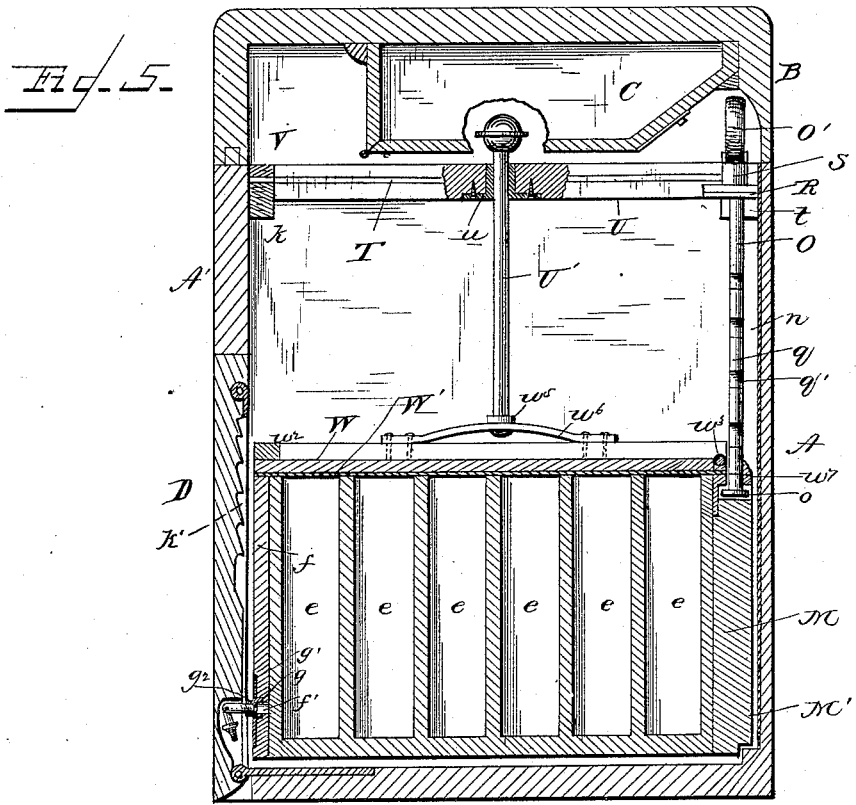
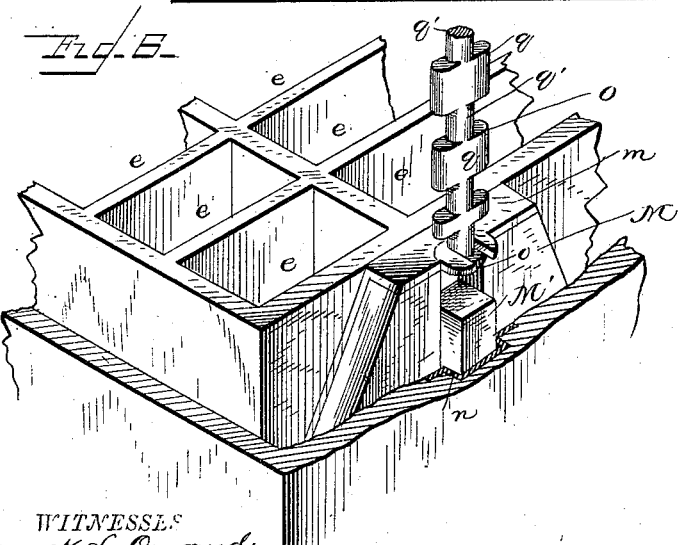
WITNESSES
Franck L. Ourand
Geo. F. Downing
INVENTOR
Theodore Schmauser
Attorney

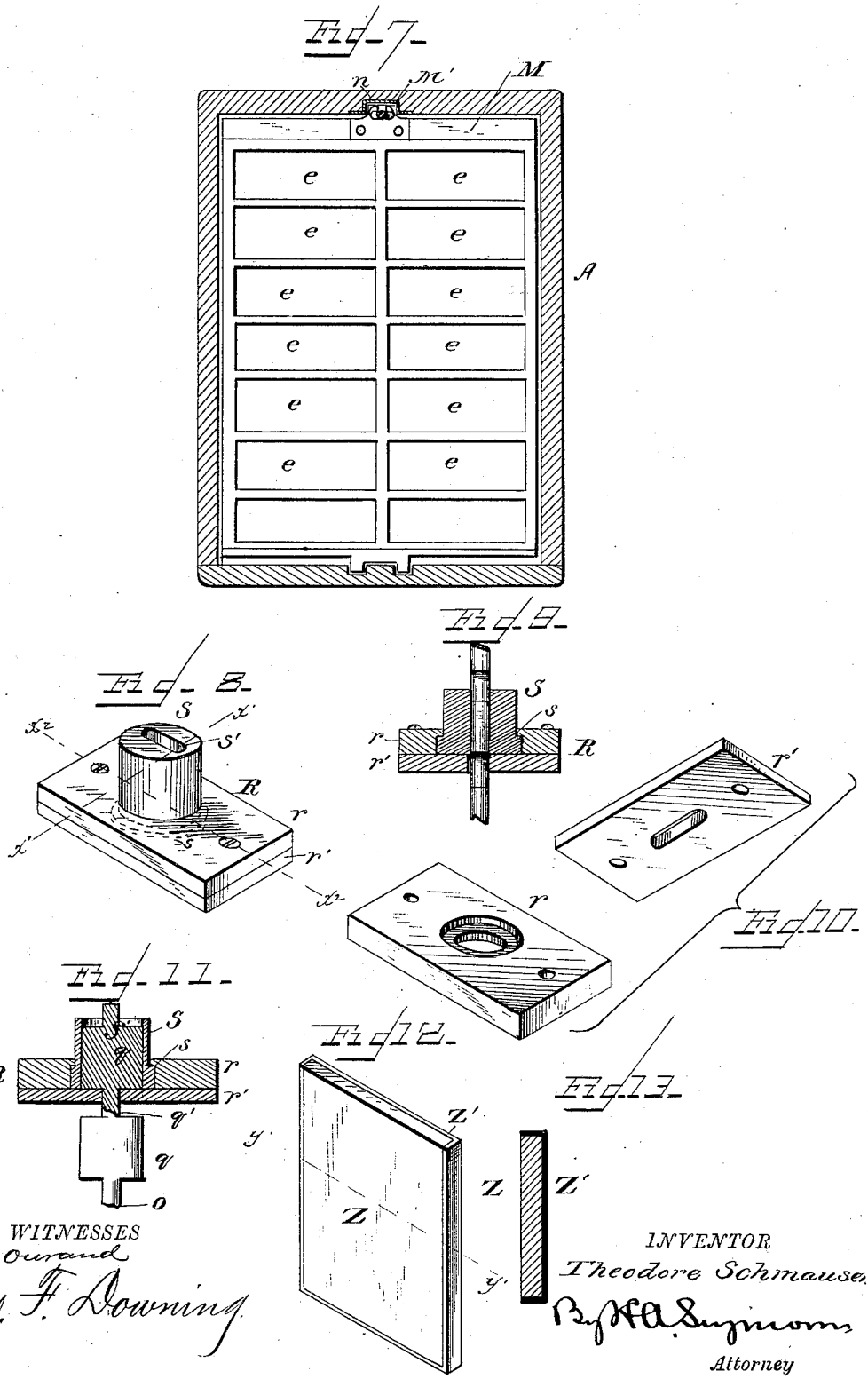

(No Model.)  6 Sheets—Sheet 5.
T. SCHMAUSER.
GALVANIC THERAPEUTIC APPARATUS.
No. 312,660. Patented Feb. 24, 1885.
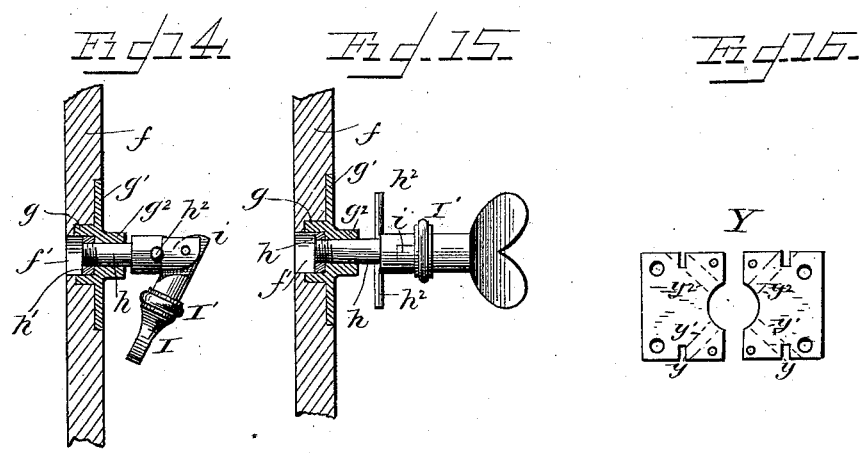
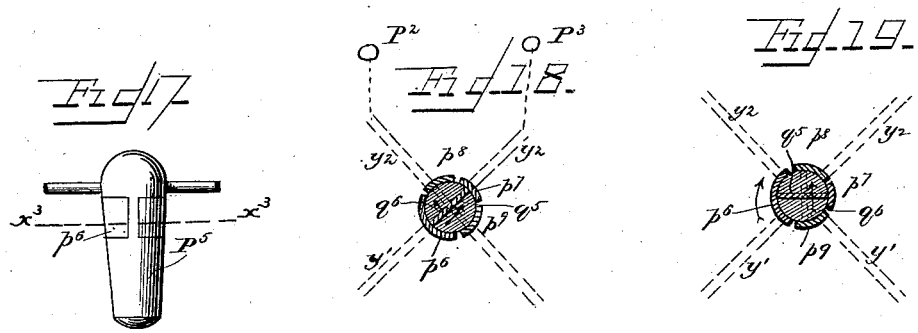
WITNESSES
Franck L. Ourand
Geo. F. Downing
INVENTOR
Theodore Schmauser
B. F. A. Symmons
Attorney

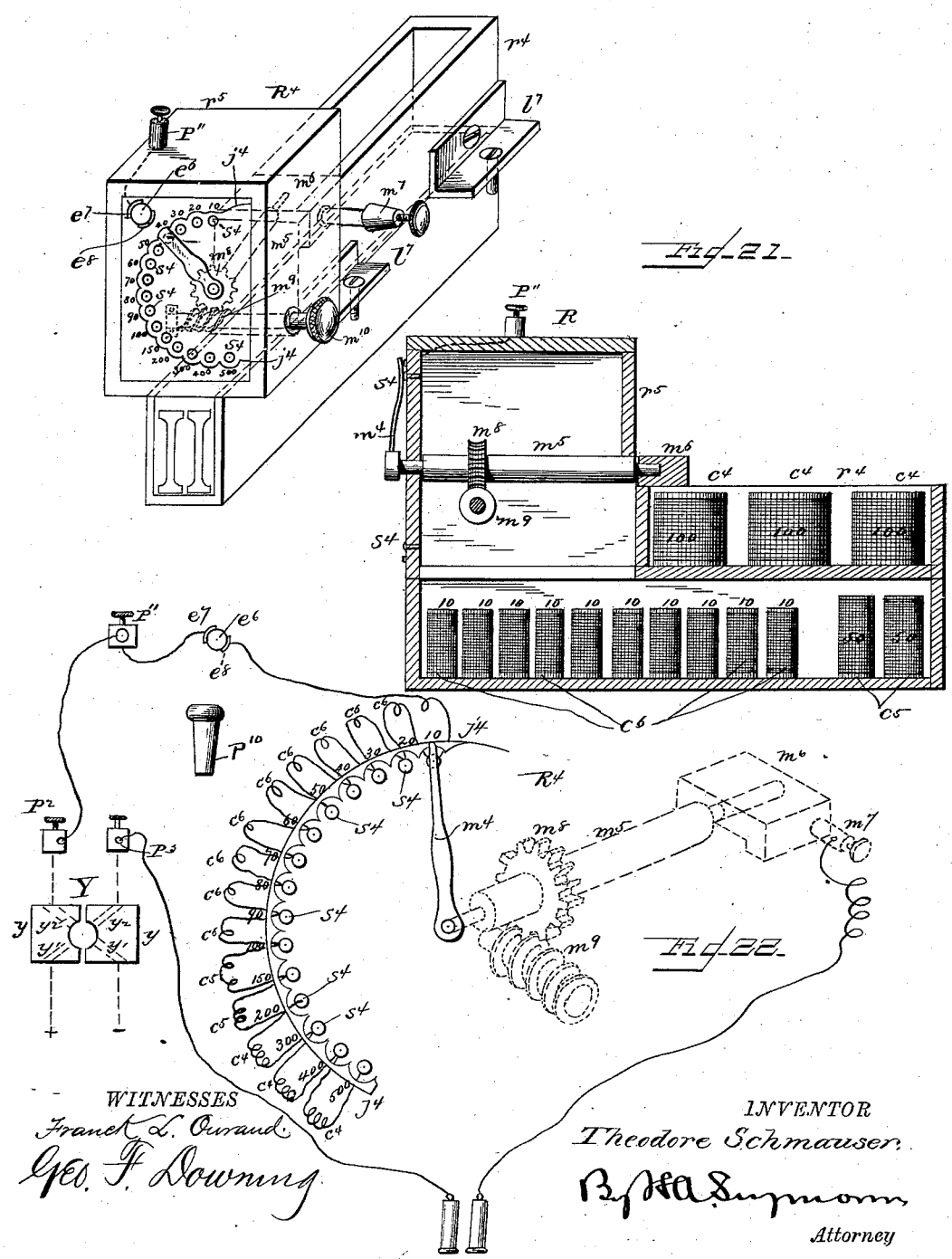

UNITED STATES PATENT OFFICE.

THEODORE SCHMAUSER, OF ALLEGHENY, PENNSYLVANIA.

GALVANIC THERAPEUTIC APPARATUS.

SPECIFICATION forming part of Letters Patent No. 312,660, dated February 24, 1885.

Application filed September 6, 1883. (No model.)

*To all whom it may concern:*

Be it known that I, THEODORE SCHMAUSER, of Allegheny, in the county of Allegheny and State of Pennsylvania, have invented certain new and useful Improvements in Galvanic Faradic Apparatus; and I do hereby declare the following to be a full, clear, and exact description of the invention, such as will enable others skilled in the art to which it appertains to make and use the same.

My invention relates to portable galvanic apparatus for therapeutic purposes, and especially to improvements in the batteries shown and described in Letters Patent Nos. 246,036 and 246,037, granted to me August 23, 1881.

The objects of my present invention are to simplify the details of construction of this class of apparatus, to improve the devices for adjusting the cells which hold the exciting-liquid, and to provide the zinc electrodes with a partial covering which will prevent oxidation thereof, except on the side facing the negative electrodes, and which will also act to in a great measure prevent the accumulation of hydrogen bubbles upon the positive electrodes.

With these ends in view my present improvement consists in certain novel constructions and combinations of devices, which will be hereinafter particularly described with reference to the accompanying drawings, and definitely pointed out in the appended claims.

In the accompanying drawings, Figure 1 is a perspective view of an electric battery constructed according to my invention, the lid or cover being raised and the front door open to show the battery-cells elevated. Fig. 2 is a front elevation of the same with the front door opened, the rheostat removed, the battery-cells in their lowest position, and the cell-cover in place. In this view, also, a portion of the front wall is broken away near the top, in order to show the arrangement of the cleats and bars for supporting the plates and the rods which secure the cell-cover in position. Fig. 3 is a top view of an apparatus with the rheostat removed. Fig. 4 is a detached perspective view of the cell-cover and the rods which are used to hold it in place. Fig. 5 is a vertical section on the line $x\ x$ of Fig. 2, the battery-plates being omitted. Fig. 6 is a rear perspective view of a portion of the battery-cells with the elevator-rod connected therewith, and showing also a portion of the rear wall of the outer casing. Fig. 7 is a horizontal section on a level with the top of the cells, as at line $y\ y$, Fig. 2. Fig. 8 is a detail perspective view of the devices for guiding and supporting the rear elevator or suspending-rod. Fig. 9 is an enlarged transverse section of the suspending-rod support on line $x'\ x'$ of Fig. 8, and Fig. 10 is a bottom perspective view of the two plates of said support separated. Fig. 11 is a longitudinal section on line $x^2\ x^2$ of Fig. 8. Fig. 12 is a perspective view of one of the positive or zinc electrodes, and Fig. 13 is a section of the same on line $y'\ y'$ of Fig. 12. Fig. 14 is a vertical section, and Fig. 15 a horizontal section, illustrating the construction and arrangement of the latching and supporting devices of the front of the cell-casing. Fig. 16 is a detached plan view of the commutator. Fig. 17 is a view in elevation of the commutator-plug. Fig. 18 is a cross-section of the same on the line $x^3\ x^3$ of Fig. 16 in one position, and Fig. 19 is a similar cross-section showing the plug in another position with relation to the commutator-strips, which are indicated in dotted lines in both of these figures. Fig. 20 is a detached perspective view of the rheostat. Fig. 21 is a longitudinal vertical section of the same, and Fig. 22 is a diagram illustrating the connections and operation of the rheostat.

The letter A indicates the inclosing battery box or casing, and B is its hinged lid, within which is arranged a compartment, C, for containing the handles, cords, plugs, and other parts which are detached when the apparatus is not in use. The upper portion of the front of the battery-box has a stationary front wall, A', in the lower edge of which is a semicircular recess, as $a$, and the lower portion of the front wall of the box is formed by a door, D, hinged at the bottom, and having at its upper end a semicircular projection, $a'$, which fits in the recess $a$, this projection being grooved across its rear face, as shown at $d$, and the groove bridged by plates $d'\ d'$. Within the battery-box is arranged a box, E, which is subdivided into two rows of cells, $e$, the walls and partitions of this box being formed, preferably, of hard rubber or ebonite, though any material may be used which will not be injured by the exciting-liquid. To the front of this box is secured an ebonite plate, $f$, at the middle and near the lower edge of which is a transverse aperture, $f'$, which is lined by a metallic bushing or thimble, $g$, which extends into it from a metallic plate, $g'$, which is secured to the front of said ebonite plate. Through the metal plate $g'$ is formed an aperture smaller in diameter than the thimble, and surrounded by an outwardly-projecting collar, $g^2$. Through this collar extends a sliding pin, $h$, having screwed upon its inner end a head, $h'$, arranged to slide in the thimble, while near its outer end pins $h^2 h^2$ project laterally in opposite directions. The outer enlarged portion of the sliding pin $h$ has a central vertical slot open at its outer end, in which is pivoted the tongue or tenon $i$, formed on the shank of a finger-button, I, and upon this shank is a sliding ring or band, I', which may be slipped upon the outer enlarged portion of the pin $h$ when the tongue or tenon $i$ is swung in line in the slot thereof, and thus the finger-button will be held in horizontal position, as shown in Figs. 1 and 15. When the ring I' is slipped off the pin, the finger-button will hang down, as shown in Figs. 5 and 14.

At the middle of the front of the box a vertical plate, K, is hinged to the lower wall or bottom thereof, and extends upward into the semicircular recess $a$, having at its upper end a horizontal tubular projection or sleeve, $k$, through which passes a removable rod, L, which is inserted through a passage formed in the stationary front wall, A'. This rod also acts as a latch-rod for the front door by passing through the groove $d$ in front of the catch-plates $d' d'$. The plate K has a vertical central slot, on opposite sides of the upper portion of which toothed flanges $k'$ project outwardly, the vertical slot being widened below these flanges, for a purpose which will presently appear. The plate K is one of the supporting devices of the cells when the latter are elevated, the pins $h^2 h^2$ of the sliding pin $h$ lying in front of the plate K and being adapted to engage with the teeth of the flanges of said plate when the sliding pin is forced inward, and may be disengaged from said teeth by slightly raising the sliding pin and pulling it outward.

In the rear surface of the door D are recesses $d^2 d^2$, to receive the toothed flanges $k k$ of the plate K, and thus permit the closing of the door.

Upon the rear surface of the box E is secured an ebonite plate, M, with inclined side edges, and having projecting from its rear surface a vertical spline, M', which is arranged to project into and slide in a vertical groove, $n$, in the rear wall of the battery-box. In the top of plate M is cut a recess, which is covered by a metallic plate, $m$, having a rear projection, in which is formed an open slot, to allow the head $o$ of a suspending or elevator rod, O, to be engaged under the plate. This elevator-rod is composed of alternate flattened portions $q$ and cylindrical portions $q'$, the flattened portions projecting on opposite side of the cylindrical portion. This rod extends upward through a guiding and supporting device, and has at its upper end a detachable handle, O', which projects above the box proper.

The guiding and supporting device R comprises two plates, $r$ and $r'$, secured flatwise together, with their rear edges let into a recess in the rear wall of the box, as shown in Fig. 5, this recess being intersected by the vertical groove $n$. The lower plate, $r'$, is formed of metal, and the upper plate, $r$, of ebonite. In the metal plate is formed a slot parallel with the rear wall of the box, and of a size to allow the flattened portions of the rod O to slide through it; and in the upper plate is a circular opening, in which is a short cylinder, S, of ebonite provided at its lower end with a flange, $s$, which fits into a countersink or recess formed in the under surface of the plate and around the aperture in which the cylinder fits. Through the cylinder is formed a flattened passage, $s'$, of the same size and shape as and in line with the slot in the lower metallic plate, so that the flattened portions of the rod O may slide through the cylinder as well as through said slot. The flattened portions of the rod are separated by a distance corresponding to the distance between the teeth of the flanges $k'$ of the vertical metallic plate K at the front of the box. Now, when the box E is raised to any desired height by means of the rod O and the button I, the front portion of said casing may be supported by engaging the pins $h^2 h^2$ with teeth of the flanges $k'$ of plate K, and when the front portion is thus supported a flattened portion of the rod O will be entirely within or at least above the lower end of the cylinder S of the rear supporting device, so that the rod and cylinder may be turned together at right angles to their normal position, and then the lower edges of the flattened portion of the rod will lie transversely with respect to the slot in the metallic plate $r'$, and consequently rest on said plate, as shown in Fig. 9, so that by means of the rod and its supporting devices the rear end of the box E will be suspended on a level with its front end. Thus it will be seen that the cells may be adjusted to effect any desired immersion of the battery-plates P and P', which depend from ebonite supporting-bars T, as shown in my patents referred to, and the ends of which rest upon cleats $t$ and $t'$, secured to the front and rear walls of the box, respectively, the rear cleat, $t$, having a portion cut away in front of the vertical groove $n$ in the rear wall, and serving, also, to brace the rod-supporting device R.

Upon the side walls of the box A are secured the side bars, U U, the upper edges of which are a little above the cleats $t$ and $t'$, and have their ends notched to receive the ends of clamping-bars V V, which rest upon the ends of the plate-supporting bars T and hold them upon the cleats $t$ and $t'$. These clamping-bars are held in position by means of screws $v$, which take into the ends of the side bars. These screws pass loosely through apertures in the clamping-bars, and are held in position for use and prevented from escaping by means of forked metallic plates $v'$, which embrace reduced portions of the screw-shanks below their heads.

Through each of the side bars, U U, is arranged an internally-threaded metallic thimble, $u$, and through these thimbles may be loosely passed headed rods U′, having directly under their heads enlarged threaded portions adapted to screw into the thimbles. The office of these rods is to hold in place the cell-cover W, the object of which is to prevent the liquid from splashing out of the cells while the battery is being transported. This cell-cover W consists of a plate of hard rubber, having its lateral edges $w\ w$ beveled to slide in corresponding horizontal grooves, $w'\ w'$, formed in the inner surfaces of the side walls of the battery-box just above the level of the top of the cells. The under surface of the cell-cover W is faced with a firmly-cemented sheet, W′, (see Fig. 5,) of vulcanized rubber of sufficient area to cover the entire battery-box and form water-tight joints with the upper edges of its walls. Along the side and front margins of the upper surface of the cell cover is a raised rim, $w^2$, preferably formed integrally with the plate, and at a little distance from the rear edge of the plate an elastic rubber tube or rod, $w^3$, is laid in a transverse groove, and has its ends inserted in sockets extending under the side portions of the rim at $w^4\ w^4$. This rod or tube thus forms the rear wall of a shallow basin, which is intended to receive the drippings of liquids from the battery-plates when the cells have been just lowered and the cell-cover inserted in place. The rods U′ U′, it will be understood, are put in place only after the cell-cover has been inserted. When they are screwed down, their lower ends or tips are pressed into sockets $w^5\ w^5$, carried by arched metallic springs $w^6\ w^6$, the downwardly-bent ends of which are secured to the side portions of the rim $w^2$. The pressure of the rods keeps the cell-cover pressed snugly in contact with the upper edges of the walls of the cell-casing to form a tight joint. In the rear edge of the cell-cover plate is a notch, $w^7$, which embraces the lower cylindrical portion of the rod O when the plate is in position. The battery-plates are to be connected in couples and to these supporting-bars, as shown in my Letters Patent No. 246,037, of August 23, 1881, heretofore referred to.

The letter Y designates an improved commutator or circuit-changer for use with my improved apparatus. The letters $y\ y$ designate two plates of hard rubber or similar insulating material supported by and secured to the plate-supporting bars T T, which are supported at the top of the outer casing, and serve to support also a rheostat and the battery-plates. These plates $y\ y$ are separated from each other by a narrow space, and they have in their adjacent edges approximately semicircular recesses or notches arranged to receive a suitable plug, which will presently be particularly described. Each of these hard-rubber plates has on its under surface two obliquely-arranged strips of metal, $y'\ y^2$, (shown in dotted lines in Fig. 16,) arranged radially in relation to a common central point, the inner end edges of the metal strips being flush with the edge walls of the notches in the rubber plates, respectively.

Referring to Fig. 3, it will be seen that the strips $y'\ y'$ of the commutator are respectively connected to the positive and negative poles of the battery, as shown by dotted lines, which indicate the metallic connecting strips or wires. The strips $y^2\ y^2$ are respectively connected, as also shown by dotted lines, to binding-posts $P^2\ P^3$, these binding-posts serving to connect with the apparatus the usual cords to which are attached the handles or other electrodes for applying the battery-current to patients.

In connection with the commutator-plates, a connecting-plug, $P^5$, is to be used. Into one side of this plug is let a segmental metal plate, $p^6$, having a curvilinear width sufficient to connect the metal strips $y^2\ y'$ of one of the commutator-plates, and directly opposite it is a similarly-shaped plate, $p^7$, having a width a little greater than that of one of the commutator-strips, these two segmental plates being connected by a metallic pin, $q^5$, which passes diametrically through the plug, the main body of which is made of hard rubber or other insulating material.

On each side of the plate $p^6$, and separated from it, are segmental plates $p^8$ and $p^9$, which reach nearly to (but are separated from) the plate $p^7$. These plates $p^8$ and $p^9$ are connected by a pin, $q$. (Shown in dotted lines, and passing diametrically through the plug at a different level from the pin $q^5$, so as to avoid metallic contact therewith.)

By referring to Fig. 19 it will be seen that the strips $y'$ and $y^2$ of one of the commutator-plates are connected by the metallic plate $p^6$, and the strips of the other commutator-plate are connected by the metallic plates $p^8\ p^9$ and pin $q^6$, the metallic plate $p^7$ lying between and not touching the two strips thus connected. A circuit-connection is now made from each strip $y'$ to the strip $y^2$ on the same plate, and the current flows as indicated by the arrows in this figure—that is, from the positive pole of the battery to binding-post $P^2$, and from the negative pole to post $P^3$. Now, to change the direction of the current, we turn the plug to the position shown in Fig. 18, where it will be seen that the strip $y'$ of one commutator-plate is connected to the strip $y^2$ of the other plate by means of the segmental plates $p^6\ p^7$ and pin $q^5$, the other two radially-opposite strips being connected by the plates $p^8$ $p^9$ and pin $q^6$.

In order to enable a more delicate graduation of the intensity of the current, especially for the treatment of the eyes, ears, and brain, and also for delicate diagnostical purposes, I have combined with my improved battery a rheostat of small dimensions, compact form, and novel construction, especially adapting it for gradually varying without breaking the current.

In the drawings, Figs. 1, 20, 21 and 22, $R^4$ designates the rheostat, the operative devices of which are inclosed in a casing, preferably made of hard rubber, and of two parts, $r^4$ and $r^5$, the former of which incloses the resistance-coils, while in and upon the latter are arranged the devices for interposing and removing resistance in and from the circuit.

In the oblong box-like portion $r^4$ of the rheostat-casing are arranged three coils, $c^4$, each of one hundred ohms resistance, two, $c^5$, of fifty ohms each, and ten, $c^6$, of ten ohms each, which are to be connected up in a manner to be presently described. The part $r^5$ of the rheostat-casing surmounts the other part at its forward end, and has in its front wall an approximately semicircular series of pins or screws, $s^4$, the heads of which project slightly in front of said wall, so that they may be successively pressed upon by a metallic spring-pointer, $m^4$, fixed upon the projecting end of a metallic shaft, $m^5$, which has one bearing in a metallic plate, $m^6$, which rests upon the top of the portion $r^4$ of the casing, and is provided with a binding-post, $m^7$, to which a wire may be connected in the usual manner.

Upon the shaft $m^5$ is a worm-wheel, $m^8$, which engages with a worm, $m^9$, mounted below it, and having its shaft projecting through the casing, and provided with a head, $m^{10}$, by which it may be conveniently turned in either direction.

Upon the outer surface of the front wall of the part $r^5$ of the casing is arranged a thin metallic strip, $j^4$, segmental in general shape, and corrugated on its inner edge. This strip is arranged just outside of and but a little distance from the series of pin-heads $s^4$, and is connected with the first one of said pin-heads at the top, (marked 10.) In the upper left-hand corner of the front wall is a plug-hole, $e^6$, on one side of which is a small metallic plate, $e^7$, and on the other side a similar plate, $e^8$. When a suitable metallic plug, $P^{10}$, is inserted in this hole, these two plates are thereby electrically connected. The plate $e^7$ is connected electrically with a binding-post, $P^{11}$, arranged upon the top of the casing.

As it is impracticable to clearly show in the other figures the manner of connecting the coils with the several contact-pins, I have introduced the diagram Fig. 22 for this purpose, and in connection with this diagram will explain the manner of using the rheostat.

In the diagram the conventional representations $c^4$ $c^5$ $c^6$ of the resistance-coils are arranged in segmental series. The first coil of ten ohms resistance has one terminal connected with the plate $e^8$ at one side of the hole $e^6$, and its other terminal is connected with the first pin, $s^4$, at the upper end of the series. The next coil has one terminal connected to this first pin and its other terminal to the second pin. The third coil has one terminal connected to the second pin and one to the third pin, the other coils being connected in the same manner to the rest of the pins to the end of the series, where the last coil of one hundred ohms has its final terminal connected to the last pin at the lower end of the series.

The part of the rheostat-casing marked $r^4$ is of a size to fit down between the plate-supporting bars T of the battery, and is provided with suitable brackets, $l^7$, to rest on said plates for supporting the rheostat, and when this part of the casing is so supported the other part, $r^5$, stands above the plate-supporting bars.

In using the rheostat the binding-post $P^2$ of the battery is connected to the binding-post $P^{11}$ on the rheostat-casing, and one of the handles or electrodes is connected to the binding-post $m^7$. Now, supposing the plug to be inserted between the commutator-plates and the battery ready for action, if the pin $P^{10}$ is inserted in the hole $e^6$, the rheostat will be included in the battery-circuit, and at this time, if the spring-pointer $m^4$ rests upon the first pin-head, $c^6$, it will be obvious that the first resistance-coil of the rheostat will have its ten-ohms resistance in circuit, and by moving the pointer to any of the pin-heads as much resistance as desired may be included in the circuit within the capacity of the rheostat, the movement of the pointer being effected by turning the worm $m^9$ by means of the head $m^{10}$ on its shaft.

It will be observed that as the pointer $m^4$ passes off the head of any pin it slides upon the metallic plate $j^4$ to the next pin, and there is thus no breaking of the circuit in moving the pointer from one pin to another.

The rheostat may be thrown out of circuit and the battery used without it by disconnecting the post $P^2$ from the rheostat and changing to this post $P^2$ the electrode-wire, which is shown as connected to the post $m^7$ in the diagram.

It will be readily understood that the number of coils in the rheostat and their resistances may be changed as desired.

I prefer to use with my apparatus a bichromate-of-potash battery having a zinc and a carbon plate in each cell, and in order to prevent an unduly rapid consumption of the zinc and to obviate the accumulation of hydrogen bubbles thereon I furnish a portion of each zinc plate with an insulating and protecting covering. This covering is made of a composition of natural asphaltum (so-called "asphalt mastic") thickly mixed with quite a coarse glass-powder, and with it I cover the entire surface of the zinc plate except that surface which faces the carbon, and after applying the covering I coat it with a medium concentrated solution of caoutchouc or india-rubber cement, which tends to hold the asphalt and glass in place. This compound covering will remain in position until the zinc plate is fully reduced by oxidation of the exposed surface, and serves not only to protect the zinc from waste, but to reduce the hydrogen bubbles which would otherwise accumulate on said plate.

In the drawings, Figs. 12 and 13, Z indicates the zinc plate and Z' the insulating and protecting covering which I have just described.

Having now described my invention, what I claim is—

1. In the galvanic therapeutic apparatus, as described, the combination, with the outer casing provided with a partial front wall having a recess in its lower edge, and the front plate for supporting the cell-casing, of a door having a projection on its upper edge to fit the recess in the lower edge of the wall, and provided with suitable catches, and the removable horizontal rod adapted to lock said door and support the upper end of said plate which supports the cell-casing, substantially as described.

2. In a galvanic therapeutic apparatus, the combination, with the cell-casing provided with the front supporting devices, as described, of the rear suspending-rod having its lower end pivotally connected with said casing and its length divided into alternate cylindrical flat portions, and a suitable rod-support and guide located at a point above the cell-casing and adapted to permit the rod to slide up or down in one position and to engage the flat portions of said rod when its flat portions are turned at right angles to such position, substantially as described.

3. The combination, with the cells and the outer casing having horizontal grooves in its side walls, of the cell-cover, consisting of a single piece of hard rubber adapted to slide in said grooves, and provided with a raised rim formed integrally therewith on its upper front and side margins, while across its rear margin is a removable and replaceable rod or tube, forming the rear wall of a basin otherwise surrounded by said rim, and the devices, as described, for pressing said cell-cover firmly down upon the cell-casing, as set forth.

4. The combination, with the rear suspending-rod, having its lower end pivoted to the cell-casing and its length divided into alternate cylindrical flat portions, of the rod-supporting device, consisting of the two plates secured together flatwise, and the cylinder provided with an oblong passage for the rod arranged through the upper plate, and having a flange in a recess between the two plates, the lower plate being slotted for the passage of the rod, substantially as described.

5. The combination, with the battery and connections, as set forth, of the commutator composed of the non-conducting plates $y\ y$, arranged upon the supporting-bars T T, and having recesses in their adjacent edges, the oblique metallic strips attached to said plates with their inner ends flush with the edge walls of the recesses, and a circular pin or plug provided with segmental metallic surfaces, connected in pairs as described, said plug being arranged to turn in the recesses, as and for the purpose set forth.

6. The combination, with the battery-plate-supporting bars, the cleats for supporting the ends of said bars, and the side bars, U, of the bars V, arranged to confine the ends of said battery-plate-supporting bars upon the cleats, and provided with fastening-screws held in place by the forked metallic plates, and arranged to screw into the side bars, substantially as described.

7. The combination, with the rear supporting-rod having alternate flat and cylindrical sections, of the rod-guide and support, consisting of the two plates $r\ r'$, the lower plate provided with a slot, and the non-conducting cylinder S, having an oblong passage, and let into the upper plate so as to turn freely therein and be engaged thereby.

8. The combination, with the battery having the plate-supporting bars T, of the rheostat inclosing the resistance-coils, and provided with the series of screws or pins $S^4$, connected with said coils, the metallic shaft $m^5$, carrying the metallic pointer $m^4$, arranged to come in contact with the pin or screw heads successively, suitable means for connecting the screws with one of the battery-poles, means for connecting an electrode with the shaft $m^5$, and the worm mechanism for turning said shaft, substantially as described.

9. The combination, with the battery and rheostat having the pointer contacts and connections, as described, of the metallic strip $j^4$, arranged adjacent to the contacts and in connection with one of the same, substantially as described, and for the purpose set forth.

10. A battery positive plate partially covered by a coating of non-conducting material having a pulverized vitreous substance mixed therewith.

In testimony whereof I have signed this specification in the presence of two subscribing witnesses.

THEODORE SCHMAUSER.

Witnesses:
   R. C. WRENSHALL,
   C. C. LEE.